US008508541B2

(12) United States Patent
Uchida

(10) Patent No.: US 8,508,541 B2
(45) Date of Patent: Aug. 13, 2013

(54) INFORMATION PROCESSING DEVICE, INFORMATION PROCESSING METHOD, AND RECORDING MEDIUM

(75) Inventor: Masaki Uchida, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 555 days.

(21) Appl. No.: 12/266,328

(22) Filed: Nov. 6, 2008

(65) Prior Publication Data

US 2009/0244073 A1  Oct. 1, 2009

(30) Foreign Application Priority Data

Mar. 25, 2008 (JP) ................................ 2008-079249

(51) Int. Cl.
*G06T 1/00* (2006.01)
*G06F 15/16* (2006.01)
*H04N 1/00* (2006.01)

(52) U.S. Cl.
USPC ............................ 345/522; 709/217; 358/402

(58) Field of Classification Search
None
See application file for complete search history.

(56) References Cited

U.S. PATENT DOCUMENTS

| 2002/0033967 A1* | 3/2002 | Liu ................................. 358/402 |
| 2002/0133492 A1* | 9/2002 | Goldstein et al. ................ 707/10 |
| 2004/0267595 A1* | 12/2004 | Woodings et al. ................. 705/9 |
| 2006/0085516 A1* | 4/2006 | Farr et al. ....................... 709/217 |

FOREIGN PATENT DOCUMENTS

| JP | 2005-136702 A | 5/2005 |
| JP | 2005-149320 A | 6/2005 |
| JP | 2005-269250 A | 9/2005 |

OTHER PUBLICATIONS

"How to Make a Link" http://www.echoecho.com/htmllinks01.htm. Archived on Jan. 20, 2000. Retrieved on Jun. 2, 2011 from <http://web.archive.org/web/20000120021542/http://echoecho.com/htmllinks01.htm>.*
"Demo of Twain scanner or camera use with csXImage in a web browser" http://www.chestysoft.com/ximage/twainupload.asp. Archived on Feb. 3, 2007. Retrieved on Jun. 2, 2011 from <http://web.archive.org/web/20070203063451/http://www.chestysoft.com/ximage/twainupload.asp>.*
"Create a Fake HTML Link in Your Site" http://www.kejut.com/fakelink. Archived on May 16, 2006. Retrieved on Sep. 28, 2011 from <http://web.archive.org/web/20060516124610/http://www.kejut.com/fakelink>.*
"TwainControlX" http://www.ciansoft.com/twaincontrolx/default.asp. Archived on Oct. 26, 2007. Retrieved on Sep. 7, 2012 from <http://web.archive.org/web/20071026102507/http://www.ciansoft.com/twaincontrolx/defaultasp?>.*

(Continued)

*Primary Examiner* — Kee M Tung
*Assistant Examiner* — Zhengxi Liu
(74) *Attorney, Agent, or Firm* — Sughrue Mion, PLLC

(57) ABSTRACT

An information processing device includes: a display control unit that causes a display unit to display either a first screen for receiving an instruction for selecting image data to be sent or a second screen for receiving an instruction to obtain image data using an image reading unit; a first screen switching unit that, if an instruction for selecting image data to be sent is received while the first screen is displayed on the display unit, switches the first screen to the second screen in response to the instruction; and an image data obtaining control unit that, if the first screen is switched to the second screen by the first screen switching unit, and an instruction to obtain image data using the image reading unit is received while the second screen is displayed on the display unit, causes the image reading unit to obtain the image data.

18 Claims, 5 Drawing Sheets

(56) References Cited

OTHER PUBLICATIONS

"Urgent Redirect Question" http://forums.digitalpoint.com/showthread.php?t=405119. Retrieved on Sep. 7, 2012. Posted on Jul. 18, 2007.*

"Redirecting anonymous users to the login page on Access Denied" http://drupal.org/node/60148. Retrieved on Sep. 7, 2012. Last updated on Dec. 7, 2007.*

Japanese Office Action dated Jan. 11, 2011 for Japanese Patent Application No. 2008-079249.

* cited by examiner

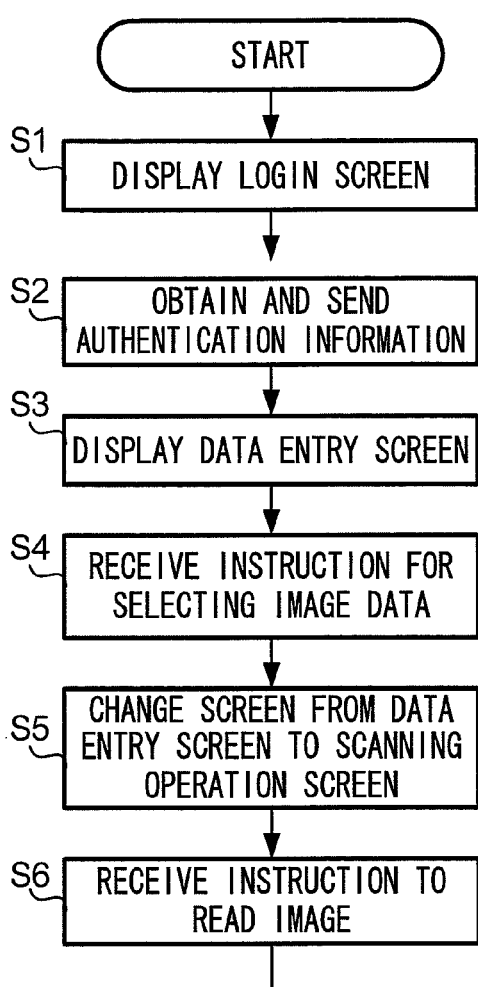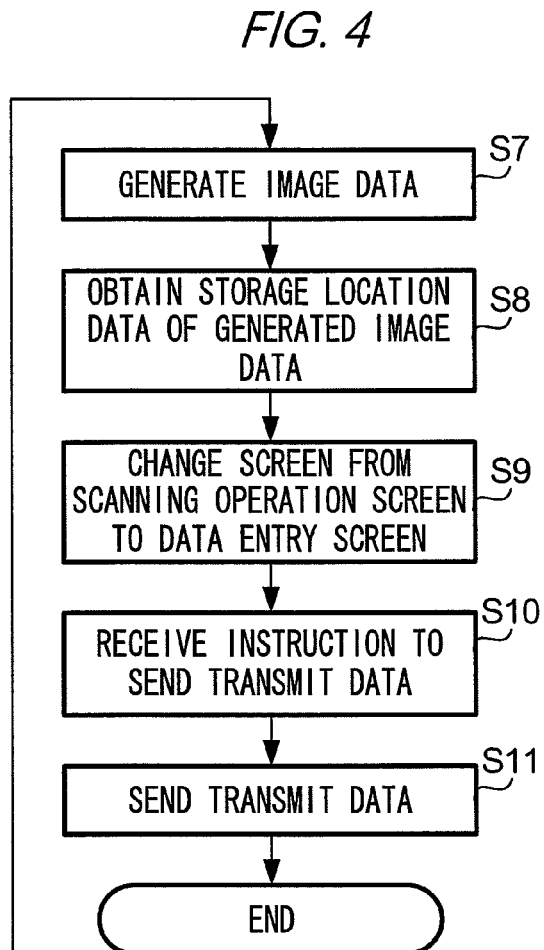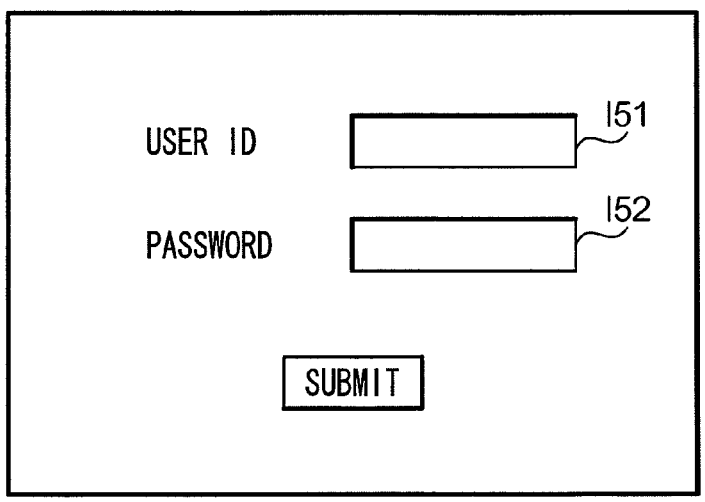
FIG. 4
FIG. 5

FIG. 6
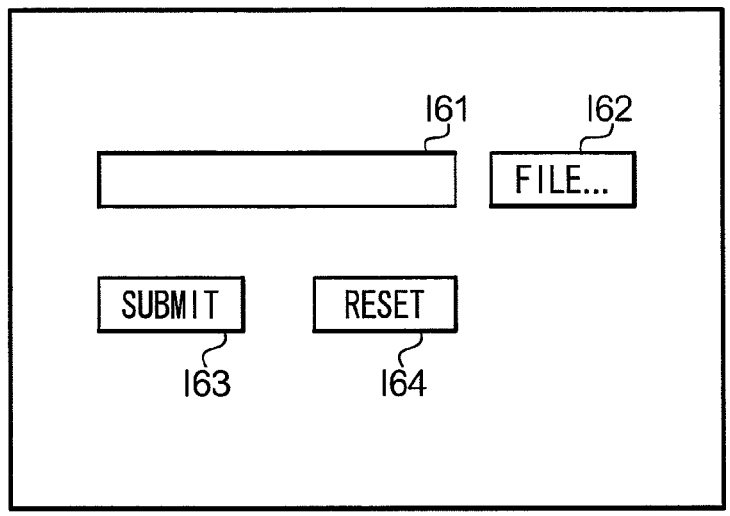
FIG. 7
```
<HTML>
<BODY>
<FORM name="name" action="http://........" method="post">
<INPUT type="file" name="postfile" class="file" value="xxxx">
<INPUT type="submit" value="SUBMIT">  T72          T71
<INPUT type="reset" value="RESET">  T73
</FORM>
</BODY>
</HTML>
```
FIG. 8
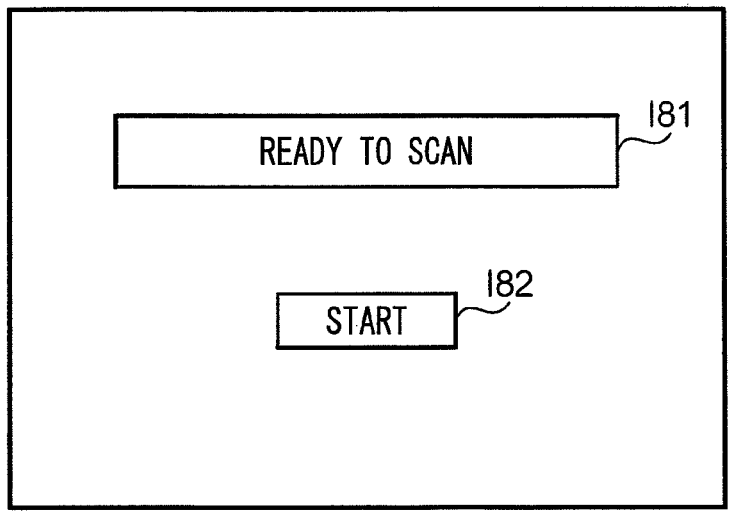

FIG. 9
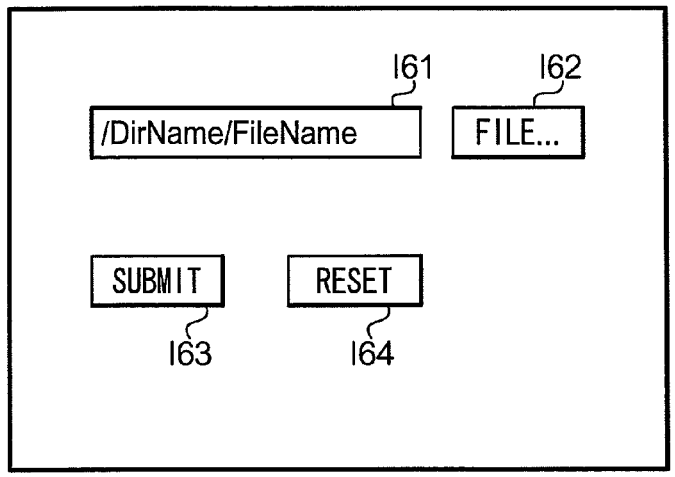
FIG. 10
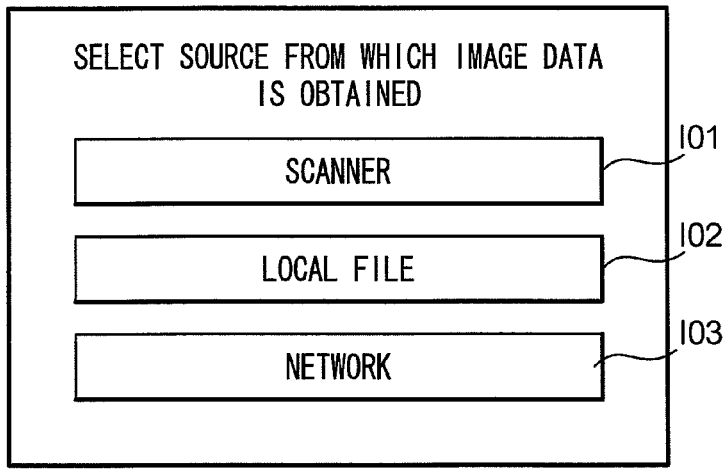
FIG. 11
```
<HTML>
<BODY>
<FORM name="name" action="http://........" method="post">
<INPUT type="file" name="postfile" class="file" value="xxxx" reso="600" color="BW">
<INPUT type="submit" value="SUBMIT">
<INPUT type="reset" value="RESET">
</FORM>
</BODY>
</HTML>
```

FIG. 12
```
<HTML>
<BODY>
<FORM name="name" action="http://........" method="post">
<INPUT type="file" name="postfile" class="file" value="xxxx"
select="scanner">
<INPUT type="submit" value="SUBMIT">
<INPUT type="reset" value="RESET">
</FORM>
</BODY>
</HTML>
```
FIG. 13
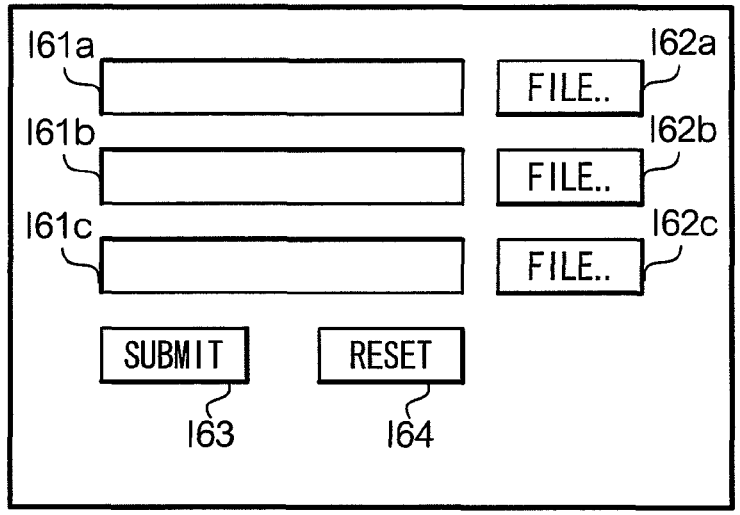
FIG. 14
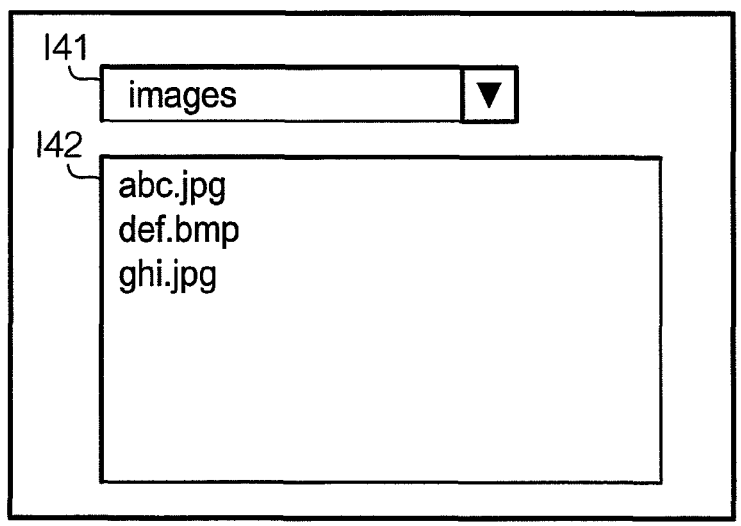

US 8,508,541 B2

INFORMATION PROCESSING DEVICE, INFORMATION PROCESSING METHOD, AND RECORDING MEDIUM

CROSS-REFERENCE TO RELATED APPLICATIONS

This application is based on and claims priority under 35 USC 119 from Japanese Patent Application No. 2008-079249 filed on Mar. 25, 2008.

BACKGROUND

1. Technical Field

The present invention relates to an information processing device, an information processing method, and a recording medium.

2. Related Art

FIGS. 6 and 14 are diagrams illustrating a screen displayed when image data is sent using a Web browser. In FIG. 6, file button I62 is an image representing a button for selecting image data which a user wishes to send. If file button I62 is selected, a screen shown in FIG. 14 (dialog) is displayed. The operation is realized in HTML (HyperText Markup Language) by specifying "file" as a value of a type attribute in an INPUT element.

In the screen shown in FIG. 14, pull-down menu I41 shows predetermined directories, and file display area I42 shows directories (sub-directories) or files classified in a selected directory. When sending image data, a user selects image data from among files shown in file display area I42.

SUMMARY

An aspect of the present invention provides an information processing device, including: a display control unit that causes a display unit to display either a first screen for receiving an instruction for selecting image data to be sent or a second screen for receiving an instruction to obtain image data using an image reading unit; a first screen switching unit that, if an instruction for selecting image data to be sent is received while the first screen is displayed on the display unit, switches the first screen to the second screen in response to the instruction; and an image data obtaining control unit that, if the first screen is switched to the second screen by the first screen switching unit, and an instruction to obtain image data using the image reading unit is received while the second screen is displayed on the display unit, causes the image reading unit to obtain the image data.

BRIEF DESCRIPTION OF THE DRAWINGS

Exemplary embodiments of the present invention will now be described in detail below with reference to the following figures, wherein:

FIG. 4 is a flowchart illustrating an operation carried out by a client device;

FIG. 5 is a diagram illustrating an example of a login screen;

FIG. 6 is a diagram illustrating an example of a data entry screen (first screen);

FIG. 7 is a diagram illustrating an example of markup data representing a data entry screen;

FIG. 8 is a diagram illustrating an example of a scanning operation screen (second screen);

FIG. 9 is a diagram illustrating an example of a data entry screen;

FIG. 10 is a diagram illustrating an example of a selection screen;

FIG. 11 is a diagram illustrating an example of markup data representing a data entry screen;

FIG. 12 is a diagram illustrating an example of markup data representing a data entry screen;

FIG. 13 is a diagram illustrating an example of a data entry screen; and

FIG. 14 is a diagram illustrating a screen displayed when image data is sent.

DETAILED DESCRIPTION

Figure 1:
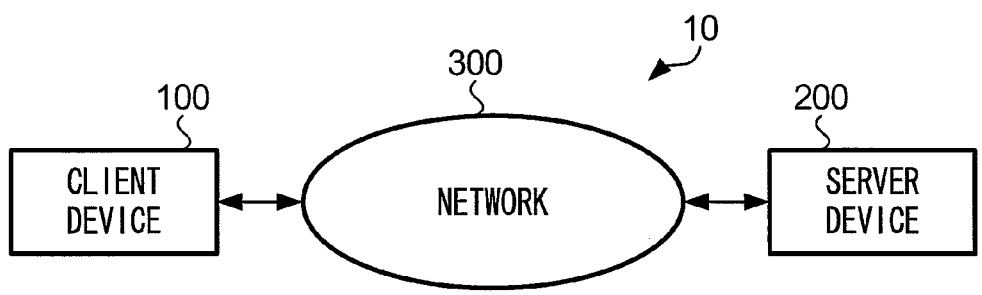
FIG. 1 is a block diagram illustrating a configuration of an information processing system.

FIG. 1 is a block diagram illustrating a configuration of an information processing system according to an exemplary embodiment of the present invention. As shown in the drawing, information processing system 10 according to the present exemplary embodiment includes client device 100, server device 200, and network 300. Information processing system 10 is a system used for business purposes; in which transmit data including image data is exchanged. Client device 100 sends transmit data, and server device 200 receives the transmit data sent by client device 100. Server device 200 serves as a Web server for providing services for business purposes, which analyzes the transmit data sent by client device 100 and processes the transmit data so as to serve the purpose of a business. Network 300 is a network for enabling communication between client device 100 and server device 200. Network 300 is the Internet in the present exemplary embodiment. Please note that plural client devices 100 may be provided in information processing system 10.

Figure 2:
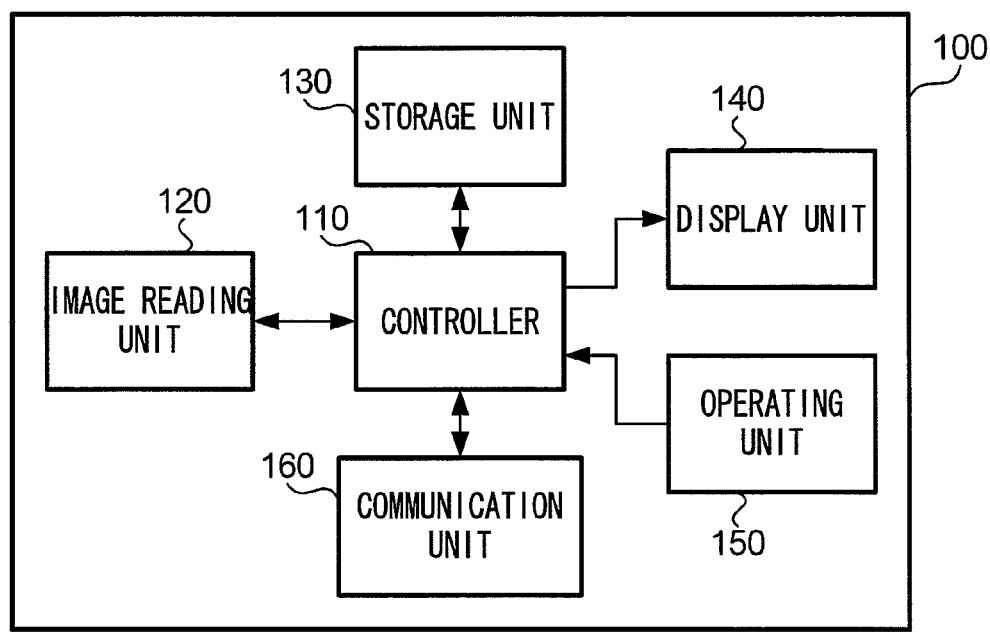
FIG. 2 is a block diagram illustrating a configuration of a client device (information processing device)

FIG. 2 is a block diagram illustrating a configuration of client device 100. Client device 100 is an image reading device connected to network 300 in the present exemplary embodiment. As shown in the drawing, client device 100 includes controller 110, image reading unit 120, storage unit 130, display unit 140, operating unit 150, and communication unit 160.

Controller 110 includes a processing unit such as a CPU and a memory, which executes a stored program to control operations of components of client device 100. Controller 110 causes image reading unit 120 to obtain image data, and causes display unit 140 to display an image. Controller 110 also generates display data representing an image to be displayed on display unit 140, and provides it to display unit 140.

Image reading unit 120 includes a scanner, which reads an image and generates image data representing the read image. Image reading unit 120 may generate image data representing a unicolor image or a multicolor image. Image reading unit 120 may also generate image data representing an image of various grey levels and generate image data representing an image of various resolutions. Image reading unit 120 according to the present exemplary embodiment is able to generate image data representing a black-and-white or a colored image in accordance with a user's instruction, and to change the resolution of the image.

Storage unit 130 includes a recording medium such as a hard disk, which stores image data generated by image reading unit 120. Storage unit 130 stores image data with a predetermined file name in a predetermined file format. A location of image data in storage unit 130 is identifiable by storage location data. Storage location data may be a file path identified by a file name and a directory name.

Display unit 140 includes a display device such as a liquid crystal display, which displays an image in a predetermined display area on the basis of display data provided from controller 110. Display unit 140, on receipt of new display data from controller 110, switches images on the basis of the new display data.

Operating unit 150 includes plural keys, which receives an instruction from a user. Operating unit 150 may also include an input device such as a mouse or a touch panel. If operating unit 150 includes a touch panel, the touch panel is provided on a display area of display unit 140. Operation unit 150 may also include an input device dedicated to input authentication information. The input device may be a device for reading data from an IC card or a device for reading biometric authentication information such as fingerprint information.

Communication unit 160 includes an interface for communicating with network 300, which exchanges data with server device 200. Communication unit 160 sends transmit data provided from controller 110 to server device 200, and provides data received from server device 200 to controller 110.

Figure 3:
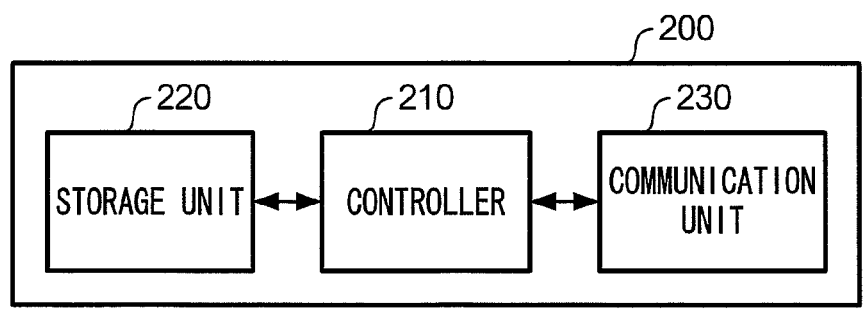
FIG. 3 is a block diagram illustrating a configuration of a server device.

FIG. 3 is a block diagram illustrating a configuration of server device 200. As shown in the drawing, server device 200 according to the present exemplary embodiment includes controller 210, storage unit 220, and communication unit 230. Controller 210 includes a processing unit such as a CPU and a memory, which executes a stored program to control operations of components of server device 200. Controller 210 also sends data to client device 100 in response to a request from the device. Storage unit 220 stores transmit data sent from client device 100, and communication unit 230 communicates with network 300.

Controller 210 sends client device 100 data including markup data. The markup data defines contents displayed on a screen, and is written in, for example, HTML or XML (Extensible Markup Language).

The foregoing is a description of a configuration of an information processing system according to the present exemplary embodiment. According to the configuration, client device 100 sends transmit data to server device 100. Client device 100, before sending transmit data, obtains image data and includes it in the transmit data.

Client device 100 executes stored programs to realize a browser application and a scanner application. The browser application is an application for realizing a Web browser function, and the scanner application is an application for realizing a reading of an image and storing of image data by image reading unit 120. Client device 100, by realizing the browser application, interprets markup data and sends transmit data. The browser application and the scanner application have unique screens displayed on display unit 140.

FIG. 4 is a flowchart illustrating an operation carried out while the browser application and the scanner application of client device 100 are running. The operation is started when the browser application is executed by controller 110 of client device 100, and a Web site provided by server device 200 is accessed by client device 100. The Web site may be accessed by specifying of a predetermined URI (Uniform Resource Identifier) of the Web site.

Controller 110 causes display unit 140 to display a screen for authenticating a user (step S1). The screen is hereinafter referred to as a "login screen". The login screen is displayed through interpretation of markup data sent from server device 200 by the browser application. Controller 110 receives an input of authentication information by a user, and sends the authentication information (step S2).

FIG. 5 is a diagram illustrating an example of the login screen. The login screen shown in the drawing is an example of a case that a set of a user ID and a password is employed as authentication information. In this case, a user selects text field I51 and inputs a user ID in the field, and selects text field I52 and inputs a password in the field. The text fields are images showing fields that can be selected by a user and in which a character string can be input by a user. If submit button I53 is selected by a user after a user ID and a password are input, the set of the user ID and the password is sent as form data. The submit button is an image showing a button that can be selected by a user.

If the submitted authentication information is correct, server device 200 accepts an input of transmit data by client device 100. Specifically, server device 200 sends markup data representing a screen for inputting transmit data to client device 100. The screen for inputting transmit data is hereinafter referred to as a "data entry screen". On receipt of the markup data, controller 110 of client device 100 causes display unit 140 to display the data entry screen (step S3). The data entry screen is an example of a first screen according to the present invention.

FIG. 6 is a diagram illustrating an example of the data entry screen. As shown in the drawing, the data entry screen shows file path field I61, file button I62, submit button I63, and reset button I64. File path field I61 is an image showing a field in which a file path, or storage location data, is displayed. File button I62 is an image showing a button for selecting image data to be sent. Submit button I63 is an image showing a button for sending transmit data. Reset button I64 is an image showing a button for resetting inputted transmit data.

FIG. 7 is a diagram illustrating an example of markup data representing the data entry screen shown in FIG. 6. The markup data is described in HTML. In the drawing, FORM elements and INPUT elements are elements related to transmission of transmit data. For example, tag T72 is a tag associated with submit button I63, and tag T73 is a tag associated with reset button I64. Tag T71 is a tag associated with file path field I61 and file button I62. Tag T71 is described so that by setting the value attribute to a predetermined value, an operation (described below) different from a normal operation is carried out. The predetermined value may be a file path of a configuration file for switching an application to the scanner application, which is described as "xxxx" in FIG. 7.

Please note that, although only image data is shown as transmit data in FIGS. 6 and 7 for convenience of explanation, transmit data may include text data. Namely, the data entry screen may also show a text field, a radio button, or a check box. Alternatively, transmit data may include data that does not require input by a user.

If controller 110 receives an instruction from a user for selecting image data, while the data entry screen on which transmit data is input is displayed (step S4), controller 110 switches a screen displayed on display unit 140 from the screen of the browser application (data entry screen) to a screen of the scanner application (step S5). In other words, controller 110 switches an application for receiving an instruction from a user from the browser application to the scanner application. This operation is different from a normal operation described above. The screen of the scanner application, displayed as a result of the operation, is hereinafter referred to as a "scanning operation screen". The scanning operation screen is an example of a second screen according to the present invention.

FIG. 8 is a diagram illustrating an example of the scanning operation screen. As shown in the drawing, the scanning operation screen shows status display area I81 and start button I82. Status display area I81 is an area in which a status of image reading unit 120 is displayed. Controller 110 obtains status data from image reading unit 120, and if it is possible for image reading unit 120 to read an image, causes display unit 140 to display a message "Ready to Scan" in status display area I81, and if it is not possible for image reading unit 120 to read an image, causes display unit 140 to display a message "Wait" in status display area I81. Start button I82 is an image showing a button for starting reading of an image by image reading unit 120.

The scanning operation screen may be configured to receive, in addition to the instruction to start reading of an image, an instruction for setting the quality of an image.

If it is possible for image reading unit 120 to read an image, and an instruction from a user to read an image is received (step S6), controller 120 causes image reading unit 120 to read an image to generate image data (step S7). The generated image data is stored in storage unit 130 by image reading unit 120, and controller 110 obtains storage location data of the image data (step S8).

Controller 110 provides the obtained storage location data to the browser application. In other words, controller 110 provides a value obtained by the scanner application to the browser application. After providing the obtained storage location data to the browser application, controller 110 switches a screen displayed on display unit 140 from the scanner operation screen to the data entry screen (step S9). Subsequently, if an instruction from a user to send transmit data is received (step S10), controller 110 sends transmit data as form data (step S11). The transmit data is data directed to be sent in a FORM element, which includes at least image data generated by image reading unit 120. The form data is data representing an image or text represented by the transmit data, in accordance with a predetermined rule. Data included in the form data is described as a value identifying the data (e.g., a value of a name attribute or a value attribute). A service provider, or server device 200, interprets the form data to identify an image or text, and arranges it on a document having a predetermined form. The service provider may arrange the image or text in a desired position on the document, and change the size of the image or text. A service receiver, or client device 100, by sending the transmit data as the form data, easily sends data via a Web. The document may be an application form to be submitted to public institutions.

FIG. 9 is a diagram illustrating an example of the data entry screen with which the scanning operation screen is replaced in step S9. The data entry screen shown in the drawing is different from the data entry screen shown in FIG. 6 in that a file path, or storage location data, has been input in file path field I61. In the data entry screen shown in FIG. 9, a term "DirName" indicates a directory name, and a term "File-Name" indicates a file name. Controller 110 causes display unit 140 to display the storage location data obtained by the scanner application in the data entry screen, as shown in FIG. 9. Controller 110 sets an image data stored in a storage area identified by the storage location data as image data to be sent as form data. In other words, controller 110 provides storage location data to be displayed in file path field I61 to the browser application. The storage location data may be automatically input in file path field I61.

The above exemplary embodiment may be modified as described below. The modifications described below may be combined with each other.

(1) Modification 1

In the above exemplary embodiment, the switching of a screen from the second screen (the scanning operation screen) to the first screen (the data entry screen) does not need to be made after image data is generated, as long as the change is made after an instruction to obtain image data is received. For example, if a storage area and a file name of image data are determined before the image data is generated, storage location data may be obtained and displayed on the first screen before the image data is generated. If storage location data of image data cannot be obtained before the image data is generated, the storage location data does not need to be displayed on the first screen. The storage location data may be displayed later after the image data is generated.

(2) Modification 2

In the above exemplary embodiment, switching of instruction input screens may be made in a variety of ways. For example, if two instruction input screens, which are screens displayed over the entire display area of display unit 140, are switched, one may be hidden, and the other may be displayed. Alternatively, if instruction input screens are window-like screens that are displayed on a part of a display area of display unit 140 and may be simultaneously displayed in the display area, switching of the screens is made by changing a screen to which an input focus is given. If there is a window displayed on top of an instruction input screen, the instruction input screen may be displayed on top of the window.

(3) Modification 3

In the above exemplary embodiment, when an instruction input screen is switched from the second screen (the scanning operation screen) to the first screen (the data entry screen), information on obtained image data may be displayed on the first screen. The information may be a character string representing storage location data or a character string representing a file name. Alternatively, an image represented by image data may be displayed on the first screen so that a user can confirm the content of the image data. In this case, the image displayed on the first screen does not need to be completely identical to the original image. For example, the image may be minified to be thumbnail-sized, or the number of colors or the grey level of the image may be reduced.

(4) Modification 4

In the above exemplary embodiment, when image data is generated by image reading unit 120, storage location data of the image data may be generated in accordance with a predetermined rule, or generated using data prepared by a user. If storage location data is generated in accordance with a predetermined rule, a new directory may be created in storage unit 130, and image data may be stored in the directory, when a file button is selected or the image data is generated. In this case, a directory name or a file name may include a character string representing time or a user ID described above. It is to be noted that the operation may be performed by controller 110 or image reading unit 120.

(5) Modification 5

In the above exemplary embodiment, a "selection" may be made in a variety of ways. For example, a "selection" may be made by clicking a button with a mouse, touching a button displayed on a touch panel, or pressing a key of operating unit 150. In essence, a "selection" may be made in any way, as long as a user can select one item from among plural items.

(6) Modification 6

In the above exemplary embodiment, a scanner application is an example of a unit for obtaining image data. It may be said that a unit for obtaining image data is realized by cooperation of a scanner application and image reading unit 120.

In the above exemplary embodiment, client device 100 may further include, in addition to image reading unit 120, another unit for obtaining image data. The unit for obtaining image data (hereinafter referred to as "image obtaining unit") may be a unit for retrieving image data stored in a storage unit or a unit for receiving image data via a communication network such as the Internet or a telephone line.

If an image obtaining unit is provided in client device 100, the device may be configured so that a user can select image reading unit 120 or the image obtaining unit as a unit for obtaining image data.

FIG. 10 is a diagram illustrating an example of a screen for selecting a source from which image data is obtained (hereinafter referred to as "selection screen"). The selection screen is an example of a third screen according to the present invention. In the drawing, selection buttons I01, I02, and I103 are images representing a button for selecting an image reading unit or an image obtaining unit. Selection button I01 is an image representing a button selected when a user wishes to obtain image data using a scanner application. Selection button I02 is an image representing a button selected when a user wishes to obtain image data using an application for retrieving image data (local file) stored in storage unit 130. The application may store image data generated on the basis of a read image, in a storage area associated with a user who caused image reading unit 120 to read the image, and retrieve the image data from the storage area. Selection button 103 is image data representing a button selected when a user wishes to obtain image data using an application for receiving image data from an external device connected to network 300 via communication unit 160. The application may allow a user to specify a URI, and download image data identified by the URI.

The selection screen may be displayed, when an instruction input screen is switched from the data entry screen to the scanning operation screen at step S5 of FIG. 4, subsequent to a display of the data entry screen and prior to a display of the scanning operation screen. Specifically, controller 110 may switch an instruction input screen from the data entry screen to the selection screen, and if a scanner application is selected on the selection screen, switch the selection screen to the scanning operation screen. If an application other than a scanner application is selected on the selection screen, controller 110 may switch the selection screen to a screen for the selected application.

(7) Modification 7

In the above exemplary embodiment, when an application (e.g., a browser application) for receiving an instruction from a user is switched to another application (e.g., a scanner application) as in the case of step 5 of FIG. 4, data may be delivered from the former application to the latter application. The data delivered may be data specifying a method by which image data is obtained.

FIG. 11 is a diagram illustrating an example of markup data representing a data entry screen used when data is delivered from an application to a subsequent application. The markup data is a revised version of the markup data shown in FIG. 7. The markup data is different from that of FIG. 7 in that it includes the portion underlined. The attributes "reso" and "color" are attributes uniquely defined for the present modification. The attribute "reso" specifies a resolution of an image represented by image data, and in FIG. 11, 600 dpi (dots per inch) is specified. The attribute "color" specifies a color of an image represented by image data, and in FIG. 11, black and white is specified. If a scanner application receives the data, it sets image quality (color and resolution) at which an image is read, on the basis of the data.

FIG. 12 is a diagram illustrating another example of markup data representing a data entry screen used when data is delivered from an application to a subsequent application. The markup data is different from that of FIG. 7 in that it includes the portion underlined. The markup data is used in a case where an image obtaining unit in addition to image reading unit 120 is provided in client device 100, as described in Modification 4. In the drawing, an attribute "select" is shown, which is an attribute uniquely defined for the present modification. The attribute "select" specifies image reading unit 120 or an image obtaining unit as a unit for obtaining image data, and in FIG. 12, a scanner is specified. A unit for obtaining image data is determined on the basis of a value specified by the attribute "select".

Please note that the attribute "select" does not need to be pre-described in markup data as shown in FIG. 12. Namely, the attribute does not need to be defined by a service provider (server device 200). An attribute may be defined at a sender of image data (client device 100), and an image may be obtained in accordance with a value specified by the defined attribute. An attribute defined at a sender of image data may be prepared by a user, or determined depending on a configuration of image reading unit 120 or an image obtaining unit.

If an attribute is defined at a sender of image data, a service provider does not need to define an attribute, and sends markup data regardless of a configuration of a sender of image data.

It is also to be noted that data exchanged between applications may be obtained via markup data shown in FIG. 11 or 12, or obtained from server device 200 individually.

(8) Modification 8

In the above exemplary embodiment, multiple pieces of image data may be selected and sent.

FIG. 13 is a diagram illustrating an example of a data entry screen used when multiple pieces of image data are selected and sent. As shown in the drawing, the data entry screen shows file path fields I61*a*, I61*b*, and I61*c*, file buttons I62*a*, I63*b*, and I64*c*, submit button I63, and reset button I64. The data entry screen shows multiple file path fields and multiple file buttons, unlike the data entry screen shown in FIG. 6. Accordingly, a user can select multiple pieces of image data. If the data entry screen is used, each time image data is selected, an instruction input screen is switched from the first screen to the second screen, and each time image data is obtained, an instruction input screen is switched from the second screen to the first screen. The selected pieces of image data are sent together in response to a selection of submit button I63.

If the data entry screen is used, and client device 100 is provided with an image obtaining unit in addition to image reading unit, as described in Modification 4, each file button may be associated with a unit for obtaining image data. For example, in the data entry screen shown in FIG. 13, if file button I62*a* is selected, image data may be obtained from a scanner, if file button I62*b* is selected, an image file which is a local file may be obtained, and if file button I62*c* is selected, image data may be obtained from an external device.

(9) Modification 9

In the above exemplary embodiment, the first screen (the data entry screen) does not need to be described in HTML format or in XML format. In essence, the first screen may be described in any format, as long as the screen enables a user to send transmit data, and can be switched to another instruction input screen.

In the above exemplary embodiment, client device 100 is an example of an information processing device or an image reading device according to the present invention. An information processing device and an image reading device according to the present invention may employ a configuration different from that of client device 100. For example, an image reading device according to the present invention may be a scanner, or a copier or a facsimile machine having a scanner function. Alternatively, an image reading device according to the present invention may be a digital camera or a camcorder. In this case, image data may be moving image data instead of still image data. Alternatively, an information processing device according to the present invention may be a personal computer that is connectable to a network and connected to a scanner and a display device.

It is to be noted that the present invention may be embodied as a program, stored on a computer readable medium, for causing a computer to function as an information processing device according to the present invention. The program may be delivered via a recording medium such as an optical disk or downloaded from a server device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principle of the invention and its practical application, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
a processor;
a display control unit which displays, on a display, a first screen for receiving an instruction for selecting prestored image data to be sent and an instruction for sending image data;
an input unit which receives, using the processor, the instruction for selecting prestored image data to be sent while the first screen is displayed,
wherein the display control unit prevents selection of the prestored image data by displaying, in response to the input unit receiving the instruction for selecting prestored image data to be sent, a second screen for receiving an instruction to read image data using an image reading unit,
wherein the first screen is part of a browser application and the second screen is part of a scanner application,
wherein while the display control unit displays the first screen, the browser application and the scanner application are running on the processor, and the display control unit prevents the selection of the prestored image data by switching from the browser application including the first screen to the scanner application including the second screen,
wherein the browser application implements a web browser function, and the scanner application is an application that realizes reading of an image using the image reading unit to generate the image data and that stores the image data in a memory;
an image data reading control unit that, if the first screen is switched to the second screen by the display control unit, and the instruction to read image data using the image reading unit is received by the input unit while the second screen is displayed on the display, causes the image reading unit to read the image data, wherein the first screen is configured to receive the instruction to send the image data read by the image reading unit;
a storage unit configured to store the image data read by the image reading unit;
a storage location data obtaining unit that, when the image data read by the image reading unit is stored in the storage unit, obtains storage location data indicating a storage location of the image data in the storage unit;
a screen switching unit that, after the image data is read by the image reading unit, switches the second screen to the first screen;
a data setting unit that sets the image data identified by the storage location data obtained by the storage location data obtaining unit, as image data to be sent; and
a sending unit that, if the second screen is switched to the first screen by the screen switching unit, and the instruction to send the image data is received while the first screen is displayed on the display, sends transmit data including the image data set by the data setting unit as image data to be sent,
wherein in response to the screen switching unit switching the second screen to the first screen, the first screen shows the obtained storage location data indicating the storage location of the image data.

2. The information processing device according to claim 1, further comprising:
a receiving unit that receives first data specifying a content of the first screen and second data specifying a method by which the image data is read by the image reading unit, wherein:
the display control unit causes the display to display the first screen on the basis of the first data received by the receiving unit, and
the image data reading control unit causes the image reading unit to read the image data on the basis of the second data received by the receiving unit.

3. The information processing device according to claim 1, further comprising:
an image data obtaining unit that obtains image data; and
a selection unit that selects either the image reading unit or the image data obtaining unit, wherein the image data reading control unit, if the image data obtaining unit is selected by the selection unit, causes the image data obtaining unit, instead of the image reading unit, to obtain the image data.

4. The information processing device according to claim 3, wherein the display control unit causes the display to display a third screen for receiving an instruction for selecting either the image reading unit or the image data obtaining unit using the selection unit, wherein the switching unit, if the selection by the selection unit is made while the third screen is displayed on the display, switches the third screen to a screen for the selected unit.

5. The information processing device of claim 1, wherein after the image data is read using the image reading unit and stored in the memory, the scanner application provides file location information of the stored image data in the memory to the browser application.

6. The information processing device of claim 1, wherein the input unit receives an input of authentication information by a user,
wherein if the input authentication information is correct, the display control unit displays the first screen, the input unit receives the instruction for selecting prestored image data, and the display control unit prevents selection of the prestored image data.

7. The information processing device of claim 1, wherein the second screen does not implement web access.

8. The information processing device of claim 1, wherein the second screen does not accept an input of a uniform resource locator (URL).

9. An information processing method, comprising:
- displaying, on a display, a first screen for receiving an instruction for selecting prestored image data to be sent and an instruction for sending image data;
- receiving, using a processor, the instruction for selecting prestored image data to be sent while the first screen is displayed;
- preventing selection of the prestored image data by displaying, in response to receiving the instruction for selecting prestored image data to be sent, a second screen for receiving an instruction to read image data using an image reading unit,
- wherein the first screen is part of a browser application and the second screen is part of a scanner application,
- wherein while displaying the first screen, the browser application and the scanner application are running on the processor, and the preventing the selection of the prestored image data comprises switching from the browser application including the first screen to the scanner application including the second screen,
- wherein the browser application implements a web browser function, and the scanner application is an application that realizes reading of an image using the image reading unit to generate the image data and that stores the image data in a memory;
- controlling, if the first screen is switched to the second screen and the instruction to read image data using the image reading unit is received while the second screen is displayed on the display, the image reading unit to read the image data, wherein the first screen is configured to receive the instruction to send the image data read by the image reading unit;
- storing the image data read by the image reading unit in a storage unit;
- obtaining, when the image data read by the image reading unit is stored in the storage unit, storage location data indicating a storage location of the image data in the storage unit;
- switching, after the image data is read by the image reading unit, the second screen to the first screen:
- setting the image data identified by the obtained storage location data, as image data to be sent;
- sending, if the second screen is switched to the first screen and the instruction to send the image data is received while the first screen is displayed on the display, transmit data including the set image data as image data to be sent; and
- showing on the first screen, in response to the switching the second screen to the first screen, the obtained storage location data indicating the storage location of the image data.

10. The information processing method of claim 9, wherein after the image data is read using the image reading unit and stored in the memory, the scanner application provides file location information of the stored image data in the memory to the browser application.

11. The information processing method of claim 9, further comprising:
- receiving an input of authentication information by a user, wherein the displaying, the receiving, and the preventing are performed if the input authentication information is correct.

12. The information processing method of claim 9, wherein the second screen does not implement web access.

13. The information processing method of claim 9, wherein the second screen does not accept an input of a uniform resource locator (URL).

14. A non-transitory computer readable medium storing a program causing a computer to execute a process for processing information, the process comprising:
- displaying, on a display, a first screen for receiving an instruction for selecting prestored image data to be sent and an instruction for sending image data;
- receiving the instruction for selecting prestored image data to be sent while the first screen is displayed;
- preventing selection of the prestored image data by displaying, in response to receiving the instruction for selecting prestored image data to be sent, a second screen for receiving an instruction to read image data using an image reading unit,
- wherein the first screen is part of a browser application and the second screen is part of a scanner application,
- wherein while displaying the first screen, the browser application and the scanner application are running on a processor, and the preventing the selection of the prestored image data comprises switching from the browser application including the first screen to the scanner application including the second screen,
- wherein the browser application implements a web browser function, and the scanner application is an application that realizes reading of an image using the image reading unit to generate the image data and that stores the image data in a memory;
- controlling, if the first screen is switched to the second screen and the instruction to read image data using the image reading unit is received while the second screen is displayed on the display, the image reading unit to read the image data, wherein the first screen is configured to receive the instruction to send the image data read by the image reading unit;
- storing the image data read by the image reading unit in a storage unit;
- obtaining, when the image data read by the image reading unit is stored in the storage unit, storage location data indicating a storage location of the image data in the storage unit;
- switching, after the image data is read by the image reading unit, the second screen to the first screen;
- setting the image data identified by the obtained storage location data, as image data to be sent;
- sending, if the second screen is switched to the first screen and the instruction to send the image data is received while the first screen is displayed on the display, transmit data including the set image data as image data to be sent; and
- showing on the first screen, in response to the switching the second screen to the first screen, the obtained storage location data indicating the storage location of the image data.

15. The non-transitory computer readable medium of claim 14, wherein the process comprises:
- after the image data is read using the image reading unit and stored in the memory, the scanner application providing file location information of the stored image data in the memory to the browser application.

16. The non-transitory computer readable medium of claim 14, wherein the process comprises:
- receiving an input of authentication information by a user, wherein the displaying, the receiving, and the preventing are performed if the input authentication information is correct.

17. The non-transitory computer readable medium of claim 14, wherein the second screen does not implement web access.

18. The non-transitory computer readable medium of claim 14, wherein the second screen does not accept an input of a uniform resource locator (URL).

\* \* \* \* \*